United States Patent [19]

Purinton, Jr.

[11] Patent Number: 4,473,408
[45] Date of Patent: Sep. 25, 1984

[54] CLEANING PIPELINE INTERIOR WITH GELLED PIG

[75] Inventor: Robert J. Purinton, Jr., Tulsa, Okla.

[73] Assignee: The Dow Chemical Company, Midland, Mich.

[21] Appl. No.: 338,928

[22] Filed: Jan. 12, 1982

[51] Int. Cl.$^3$ ............................................. B08B 9/04
[52] U.S. Cl. ..................... 134/8; 134/22.14; 166/308; 252/315.1
[58] Field of Search ............... 134/22.1, 22.11, 22.12, 134/22.14, 22.19, 8; 166/308; 252/315.1

[56] References Cited

U.S. PATENT DOCUMENTS

| | | | |
|---|---|---|---|
| 3,010,853 | 11/1961 | Elliott | 134/22.12 X |
| 3,281,268 | 10/1966 | Martin | 134/22.12 X |
| 3,473,572 | 10/1969 | Nielson | . |
| 3,505,374 | 4/1970 | Monroe | . |
| 3,523,826 | 8/1970 | Lissant | 134/22.12 |
| 3,757,864 | 9/1973 | Crawford | . |
| 4,003,393 | 1/1977 | Jaggard | . |
| 4,104,173 | 8/1978 | Gay | 252/315.1 X |
| 4,174,283 | 11/1979 | Griffin | 166/308 X |
| 4,200,539 | 4/1980 | Burham | 166/308 X |
| 4,200,540 | 4/1980 | Burham | 166/308 X |
| 4,216,026 | 8/1980 | Scott | . |
| 4,316,810 | 2/1982 | Burham | 166/308 X |

FOREIGN PATENT DOCUMENTS 1935875 2/1970 Fed. Rep. of Germany .

Primary Examiner—Sidney Marantz

[57] ABSTRACT

Organic gels comprising (a) a nonpolar, liquid, organic solvent and (b) a gelling amount of a mixture of (1) an alkyl oleyl phosphate and (2) an alkali metal aluminate. The gels have many uses, one of which is as a gelled pig for pipeline cleaning.

18 Claims, No Drawings

CLEANING PIPELINE INTERIOR WITH GELLED PIG

BACKGROUND OF THE INVENTION

1. Field of the Invention

This invention pertains to novel organic gels and to their uses. In particular, this invention pertains to organic gels of non-polar liquid organic solvents (e.g. perchlorinated alphatic hydrocarbons of one to two carbon atoms, such as perchloroethylene). This invention also pertains to the use of such organic gels as gelled pigs in pipeline cleaning.

2. Description of the Prior Art

Pipeline efficiency in volume can be lost by scale buildup in the interior lining of the pipe. Mechanical pigs and/or gelled chemical pigs have been used to remove scale. The mechanical pigs are normally solid bullet-shaped devices which have wire brushes or abrasive surfaces to physically abrade the scale interior of the pipe. The gelled chemical pigs on the other hand, remove the surface deposits by dissolution and/or by picking up loose debris as they pass through the pipeline. Purinton described a variety of aqueous gels which were useful in pipeline cleaning in Ser. No. 241,962 filed Mar. 9, 1981. The disclosure of this patent application is incorporated herewith by reference.

Scott described a method for cleaning pipeline using an aqueous gel of a different type in U.S. Pat. No. 4,216,026. Scott alleges that plugs of Bingham plastic fluids are effective in picking up loose debris and minor amounts of liquids as the plug moves through the pipeline. The plug is used in combination with mechanical scrapers.

Jagger et al. also described a method of removing fluids and solids from a pipeline in U.S. Pat. No. 4,003,393 using an organic liquid gel with a metal salt of an aliphatic ester of orthophosphoric acid.

While the aforementioned aqueous gels have many desirable properties, certain types of scale or scale components are effectively removed only by an organic solvent. In most instances, a "fill and soak" type treatment with a liquid solvent is not practical due to the volume of solvent required. Waste disposal of such a large volume of material is also a commercial problem. Applicant conceived that these problems could be solved by a gelled organic pig if a gel of suitable stability could be found.

There are, of course, many organic gels described in the literature. For example, in U.S. Pat. No. 3,505,374 Monroe described the use of magnetite salts of alkyl oleyl orthophosphate as gelling agents for hydrocarbons and halogenated hydrocarbon liquids. Crawford et al. (U.S. Pat. No. 3,757,864) taught that the pressure drop of a confined non-polar organic liquid in motion due to friction is lessened by admixing with the liquid one or more aluminum salts of an aliphatic orthophosphate ester. Crawford et al. also taught that such esters can gel the liquids. Dickerson (U.S. Pat. No. 3,219,619) thickened hydrocarbons with t-butylstyrene interpolymers containing metal carboxylate groups. Haigh et al. (U.S. Pat. No. 3,527,582) formed reversible gels of liquid hydrocarbons using a crosslinked latex polymer of an alkyl styrene. But, as Monroe illustrates, thickened organic fluids are not the same as organic gels. With organic gels, the gel consistency will not disappear on dissolution of the gel. With sufficient dissolution, the solvent swollen gelling agent will appear as a distinct phase in suspension. Moreover, the gel structure has a viscosity profile that is quite different from liquids that are merely thickened but not gelled. If a gel is to be used as a pipeline pig, the rheology and chemical and physical properties of the gel must meet certain demands. For example, the gel must be viscoelastic and self-sustaining so that it will not break up as it is being forced through the line under pressure. It is also desirable for the gel to have the capacity to retain suspended solids and the ability to sustain a gel/liquid interface. This later capability is needed because in many instances it is desirable to displace with the gelled pig and/or to drive the pig directly with a liquid under pressure. Also, it is desirable in many instances to use a pig train which will have one or more chemical pig segments and the gel desirably would have a gel structure that would prohibit or substantially inhibit comingling of liquids in front of and/or behind the gelled pig (sometimes called fluid by-pass).

SUMMARY OF THE INVENTION

It has now been discovered that organic gels comprising: (a) a non-polar, liquid, organic solvent and (b) a gelling amount of a mixture of (1) an alkyl oleyl phosphate and (2) an alkali metal aluminate, have very desirable properties. These organic gels can be used as gelled pigs to remove organic soluble scale or scale contaminants from pipeline and can also be used in a variety of other ways.

DETAILED DESCRIPTION

Non-polar, liquid, organic solvents form a known class of organic compounds, essentially any member of which can be used herein. This class includes, for example, normally liquid aromatic hydrocarbons (e.g. benzene, toluene, 1,4-dimethylbenzene, 1,3,5-trimethylbenzene, etc.), aliphatic hydrocarbons (e.g. kerosene, gasoline, petroleum ether, etc.), chlorinated hydrocarbons (e.g. carbon tetrachloride, perchloroethylene, 1,4-dichlorobenzene, etc.), and the like. Of these organic solvents, gels prepared from kerosenes, toluene, or perchlorinated alphatic hydrocarbons of one to two carbons atoms are preferred based on the commercial availability of the solvents and their excellent solvent properties. Gels prepared from perchloroethylene are most preferred.

The gelling agent is a mixture of (1) an alkyl oleyl phosphate and (2) an alkali metal aluminate.

The alkyl oleyl phosphates constitute a known class of compounds having many members. Of these, the ($C_1$–$C_4$) alkyl oleyl phosphates are preferred, and ethyl oleyl phosphate is most preferred. There are variety of known chemical reactions which can be used to prepare the alkyl oleyl phosphates.

However, it should be noted that the presence of a monoester phosphoric acid reduces the effectiveness of the alkyl oleyl phosphate as a gelling agent. So, reaction processes which maximize the formation of the desired alkyl oleyl phosphate at the expense of the monoester are preferred.

The alkali metal aluminates are likewise a known class of compounds. Of these, sodium aluminate and potassium aluminate are preferred, and sodium aluminate is most preferred.

The ratio of alkyl oleyl phosphate to alkali metal aluminate can be varied. A preferred ratio, however, is from about 7 to about 12 volumes of alkyl oleyl phosphate per volume of alkali metal aluminate. More preferably, a ratio of from about 9 to about 10 volumes of alkyl oleyl phosphate per volume of alkali metal aluminate.

The mixture of alkyl oleyl phosphate and alkali metal aluminate is added to the organic solvent in an amount sufficient to cause gellation. This amount will vary depending upon the particular organic solvent. Typically, however, amounts of from about 1.5 to about 5 weight percent (based on the weight of the solvent) of gelling agent is sufficient.

The gels are conveniently prepared by dissolving the appropriate amount of alkyl oleyl phosphate in the organic solvent and subsequently adding the alkali metal aluminate to the mixture with thorough mixing.

The gel formulations have a variety of uses. One such use is as a gelled pig in cleaning pipelines. In this utility, the gel can be mixed external to the pipeline and pumped into place. Alternatively the components can be blended "on the fly" and the gel formed in situ. The gel is then forced through the pipeline by a fluid (either gas or liquid) under pressure. If a gas is used as the driving force, a squeegee pig (i.e. foamed polymer plug, such as a polyurethane foam plug) is used behind the gel to assist in preventing fluid bypass. The gelled pigs of the present invention are usually used as one segment or element or a pig train containing other chemical pigs of the same or different composition. For example, one could have segments in the pig train of liquid or gelled acid, a desiccating alcohol (e.g. methanol or isopropanol) in liquid or gelled form, an aqueous gel containing a bactericide, an aqueous gel to suspend and carry solids or to separate liquids, etc. In these pig trains, one might find it advantageous to include one or more mechanical pigs. For example, it is convenient in many instances to insert a squeegee pig or scraper pig in the pig train to restrict fluid bypass, to physically separate chemical segments of the train, to abrade the walls of the pipeline, etc. The number of combinations and permutations in staging a pig train are limited only by the skilled artisan's imagination and need at the time.

The following examples will further illustrate the invention.

EXPERIMENTAL

Preparation of the alkyl oleyl phosphate: the phosphate ester was prepared in a two stage reaction. First, substantially equal molar amounts of triethyl phosphate and phosphorus pentoxide ($P_2O_5$) were blended together in a mixed aromatic solvent and warmed at 70° C. for one hour. Then, a stoichiometric amount of oleyl alcohol was added and the reaction mixture heated at 90° C. for two hours. The reaction product thus produced was a dark liquid (75 percent solids) having only minor amounts of mono-alkyl ester by-product with the remainder being the desired ethyl oleyl phosphate (greater than 90 percent of theoretical yield). This reaction mixture was used without further purification as the gelling agent to gel kerosene, perchloroethylene and a mixed aromatic solvent which is predominantly toluene. In each instance, the ethyl oleyl phosphate mixture was dissolved in the organic solvent and aqueous sodium aluminate (38 percent solids in water) was added subsequently with vigorous stirring. The shear strength of the gels was measured at the end of one hour after mixing and then again at the end of a 21-24 hour period using a model BAROID SHEAROMETER TUBE. The data are summarized in Table I.

TABLE I

| Solvent | Gelling Agent (gallons/1000) | Shear Strength 1 hr.(lbs/100 ft. 2) | Shear Strength 21-24 hr. (lb/100 ft 2) |
|---|---|---|---|
| Kerosene | 25 | 17.0 | 146 |
| | 30 | 41.3 | 207 |
| | 40 | 96.7 | 211 |
| | 50 | 218.4 | 398 |
| Mixed Aromatics | 25 | 9.0 | 31.8 |
| | 30 | 13.3 | 36.0 |
| | 40 | 19.8 | 57.3 |
| | 50 | 25.7 | 86.3 |
| Perchloroethylene | 25 | 10.9 | 45.5 |
| | 30 | 18.1 | 89.6 |
| | 40 | 24.0 | 93.8 |
| | 50 | 34.4 | 158.7 |

These data show the effectiveness of the gelling agents in gelling a variety of organic liquids and the data also show that the gel strength improves upon standing. For these reasons, it may be desirable to batch mix the gels prior to their use, depending upon the chosen utility.

What is claimed is:

1. A method of cleaning the interior of a pipeline comprising passing through said pipeline a gelled pig which comprises (a) a nonpolar, liquid, organic solvent, and (b) a gelling amount of a gelling agent mixture of (1) a phosphate ester component which is composed predominantly of an alkyl oleyl phosphate and (2) an alkali metal aluminate.

2. The method defined by claim 1 wherein the alkyl oleyl phosphate is ethyl oleyl phosphate.

3. The method defined by claim 1 wherein the alkali metal aluminate is sodium aluminate.

4. The method defined by claim 1 wherein the solvent is a normally liquid aromatic or aliphatic hydrocarbon or a chlorinated derivative thereof.

5. The method defined by claim 1 wherein the solvent is a perchlorinated aliphatic hydrocarbon to 1 to 2 carbon atoms.

6. The method defined by claim 1 wherein the solvent is carbon tetrachloride, or perchloroethylene, and the gelling agent is a mixture of (1) ethyl oleyl phosphate and (2) sodium aluminate.

7. The method defined by claim 1 wherein from about 7 to about 12 volumes of the alkyl oleyl phosphate is employed per one volume of the alkali metal aluminate and wherein the alkyl oleyl phosphate/alkali metal aluminate mixture is employed in an amount of from about 1.5 to about 5 weight percent based upon the weight of the nonpolar organic solvent.

8. The method defined by claim 1 wherein said gelled pig is a segment of a pig train.

9. The method defined by claim 8 wherein said pig train contains a plurality of chemical pig segments.

10. The method defined by claim 8 or 9 wherein said pig train additionally contains at least one mechanical pig.

11. The method defined by claim 10 wherein at least one of said mechanical pigs is a foamed polyurethane swab included as the last segment of the pig train, and wherein said pig train is driven by an inert gas or liquid under pressure.

12. A method of cleaning the interior of a pipeline comprising passing through said pipeline a gelled pig which comprises (a) a nonpolar, liquid, organic solvent, and (b) a gelling amount of a gelling agent mixture of (1) an alkali metal aluminate and (2) an alkyl oleyl phosphate prepared by first reacting a substantially equal molar mixture of a trialkyl phosphate and phosphorous pentoxide and thereafter reacting the resulting reaction product with oleyl alcohol.

13. The method defined by claim 12 wherein the alkyl oleyl phosphate is ethyl oleyl phosphate and wherein the trialkyl phosphate is triethyl phosphate.

14. The method defined by claim 12 wherein from about 7 to about 12 volumes of the alkyl oleyl phosphate is employed per one volume of the alkali metal aluminate and wherein the alkyl oleyl phosphate/alkali metal aluminate mixture is employed in an amount of from about 1.5 to about 5 weight percent based upon the weight of the nonpolar organic solvent.

15. The method defined by claim 12 wherein the alkali metal aluminate is sodium aluminate.

16. The method defined by claim 12 wherein the organic solvent is a normally liquid aromatic or aliphatic hydrocarbon or a chlorinated derivative thereof.

17. The method defined by claim 12 wherein the organic solvent is a perchlorinated aliphatic hydrocarbon of 1 to 2 carbon atoms.

18. The method defined by claim 12 wherein the solvent is carbon tetrachloride, or perchloroethylene, and the gelling agent is a mixture of ethyl oleyl phosphate and sodium aluminate.

* * * * *